(12) United States Patent
Iizuka et al.

(10) Patent No.: US 6,450,301 B1
(45) Date of Patent: Sep. 17, 2002

(54) BRAKE DEVICE

(75) Inventors: Chikashi Iizuka; Yoshinobu Honda, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/947,750

(22) Filed: Sep. 7, 2001

(30) Foreign Application Priority Data

Sep. 8, 2000 (JP) ........................................ 2000-272889

(51) Int. Cl.[7] .............................................. F16D 55/22
(52) U.S. Cl. ...................... 188/26; 180/219; 188/72.4; 280/276
(58) Field of Search ................................. 180/219, 226, 180/231; 280/275, 276; 188/72.4, 72.5, 73.2, 26, 71.1, 72.1, 344; 303/137

(56) References Cited

U.S. PATENT DOCUMENTS 4,702,339 A * 10/1987 Hayashi et al. ............. 180/219

5,249,650 A * 10/1993 Tanaka ........................ 188/344

FOREIGN PATENT DOCUMENTS

JP     B22782466     5/1998
JP     A 11-230201   8/1999

* cited by examiner

*Primary Examiner*—Matthew C. Graham
(74) *Attorney, Agent, or Firm*—Birch, Stewart, Kolasch & Birch, LLP

(57) ABSTRACT

A motorcycle includes a rear wheel supported by a swing arm, and a damper extends between the swing arm and the body. A swing arm extension portion extends in the rearward direction from a rear wheel shaft supporting portion of the swing arm. The damper is connected to a rear end connecting portion of the swing arm extension portion. A brake device includes a parking brake caliper and a rear brake caliper. The parking brake caliper and the rear brake caliper are arranged above and below the swing arm extension portion. The rear brake caliper and the parking brake caliper can be mounted without shifting the swing arm toward the outside in the body in the width direction more than necessary.

19 Claims, 5 Drawing Sheets

BRAKE DEVICE

This nonprovisional application claims priority under 35 U.S.C. § 119(a) on Patent Application No. 2000-272889 filed in Japan on Sep. 8, 2000, which is herein incorporated by reference.

BACKGROUND OF THE INVENTION

1. Field of the Invention

The present invention relates to a brake device of a motorcycle which is provided with a plurality of independent brake calipers at a rear wheel side.

2. Description of the Background Art

In Japanese Patent Publication No. 2782466 "motorcycle", a brake device of a motorcycle is proposed which mounts a brake caliper for rear brake on an arm member (swing arm). In this brake device of the motorcycle, the rear brake caliper is mounted on a support bracket of the swing arm and a brake force is applied to a brake disc of a rear wheel using this rear brake caliper.

Among motorcycles, there exists a vehicle which requires a parking brake in addition to the rear brake. To provide a caliper of this parking brake together with the rear brake caliper at the outer periphery of the brake disc, a space for mounting the parking brake caliper is necessary. However, with respect to the motorcycle disclosed in the above-mentioned publication, the swing arm covers the brake disc and hence, it is impossible to ensure the space for mounting the parking brake caliper.

In JP-A No. 230201/1999 "disc brake device", a brake device is proposed which is provided with two kinds of calipers, that is, a rear brake caliper and a parking brake caliper. In this disc brake device, the rear brake caliper and the parking brake caliper are mounted on a mounting bracket and a boss portion of the mounting bracket is fitted on a rear wheel shaft so that the mounting bracket is supported on the rear wheel shaft.

According to this device, since it is unnecessary to mount the rear brake caliper and the parking brake caliper on a swing arm of a motorcycle, it is relatively easy to arrange two kinds of brake calipers at positions corresponding to a brake disc of a rear wheel. However, with respect to this disc brake device, since the boss portion of the mounting bracket is fitted on the rear wheel shaft, it is necessary to additionally shift the swing arm to the outside in the body width direction by an amount of thickness of the boss portion.

As a result, it is necessary to arrange the swing arm while avoiding the boss portion which is bulged in the side direction and hence, the arrangement of the swing arm receives the restriction whereby the degree of freedom of designing becomes small. Further, since the swing arm is additionally shifted to the outside in the body width direction, there may be a case that a bank angle of the motorcycle cannot be sufficiently ensured.

SUMMARY OF THE INVENTION

It is therefore an object of the present invention to provide a brake device of a motorcycle which can mount a rear brake caliper and a parking brake caliper without shifting a swing arm to the outside in the body width direction more than necessary.

To achieve the above-mentioned object, a brake device of a motorcycle supports a rear wheel with a swing arm mounted on a body, stretches a damper between the swing arm and the body, and includes first and second brake calipers to apply a brake force to a brake disc of the rear wheel. A swing arm extension portion which is extended in the rearward direction from a rear wheel shaft supporting portion is formed on the swing arm, one end of the damper is connected to a rear end of the swing arm extension portion, and the first and second brake calipers are disposed above and below the swing arm extension portion.

The swing arm extension portion which is extended in the rearward direction from the rear wheel shaft supporting portion is formed on the swing arm. A space which faces an outer periphery of an upper portion of the brake disc can be formed at an upper side of the swing arm extension portion and a space which faces an outer periphery of a rear portion of the disc brake can be formed at a lower side of the swing arm extension portion.

Accordingly, the first and second brake calipers which are arranged above and below the swing arm extension portion can be mounted on the upper and lower sides of the swing arm extension portion. In addition, it is possible to make the first brake caliper face the outer periphery of the upper portion of the brake disc and it is also possible to make the second brake caliper face the outer periphery of the rear portion of the brake disc. The rear brake caliper and the parking brake caliper can be mounted without shifting the swing arm to the outside in the body width direction more than necessary.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Hereinafter, the mode for carrying out the present invention is explained in conjunction with the attached drawings. Here, "front", "rear", "left", "right", follow directions as viewed from a rider.

Figure 1:
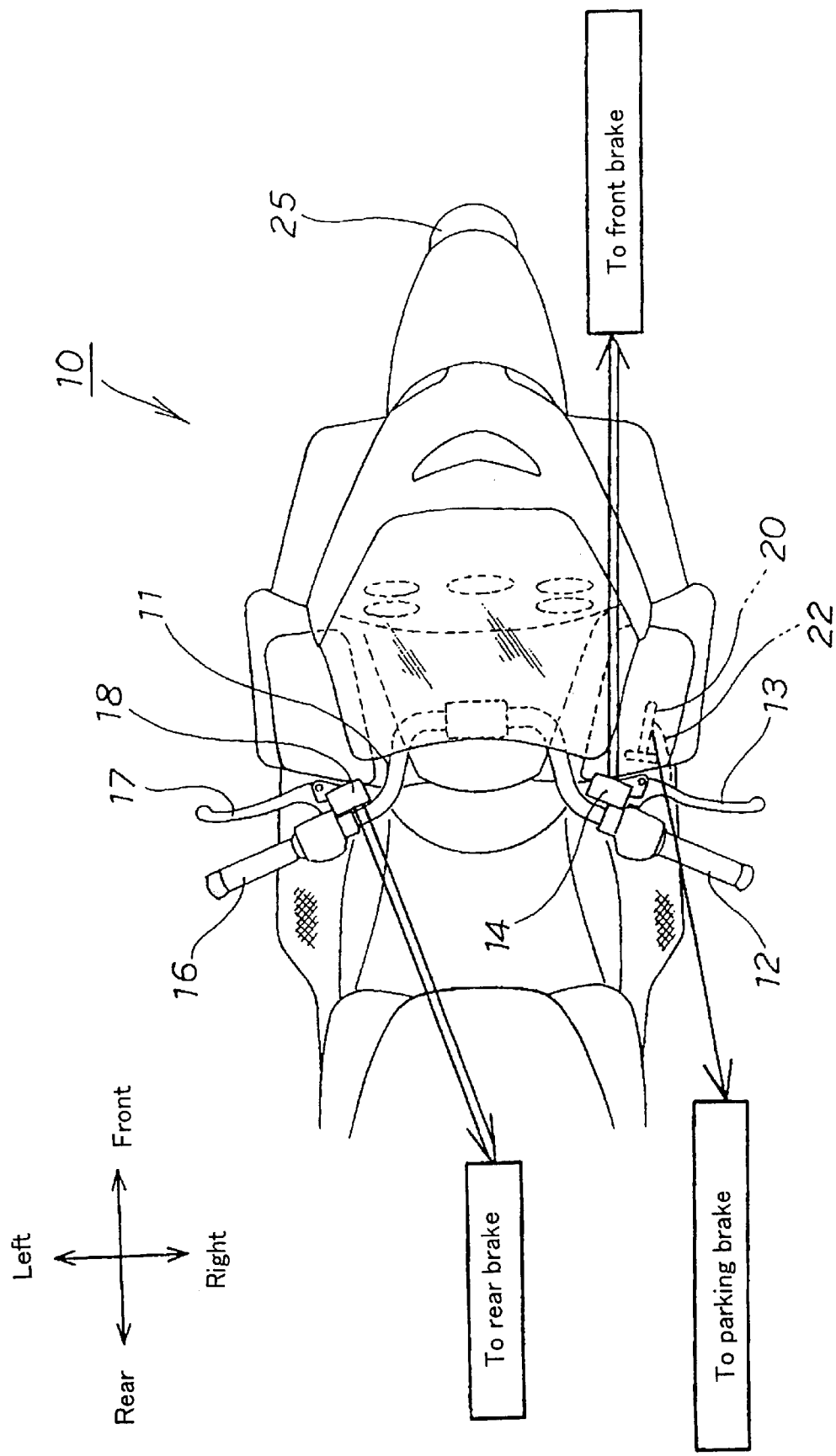
FIG. 1 is a plan view of a motorcycle according to the present invention.

As shown in FIG. 1, a motorcycle 10 is provided with a front brake lever 13 in the vicinity of a right grip 12 of a handle 11 and is provided with a rear brake lever 17 in the vicinity of a left grip 16 of the handle 11. A parking lever 20 is arranged at the right side of a body by mounting the parking lever 20 on a head pipe of a body frame.

When a rider grips the front brake lever 13, a master cylinder 14 generates hydraulic pressure and a brake pad of a front brake caliper is pushed to a front brake disc due to this hydraulic pressure so that a brake force is applied to a front wheel 25.

When the rider grips the rear brake lever 17, a master cylinder 18 generates hydraulic pressure and a brake pad of a second brake caliper (a rear brake caliper) is pushed to a rear brake disc due to this hydraulic pressure so that a brake force is applied to a rear wheel. Further, when the rider pulls the parking lever 20 upward, a cable 22 is pulled so that a brake pad of a first brake caliper (a parking brake caliper) is pushed to the rear brake disc to hold the rear wheel in a locked state.

Figure 2:
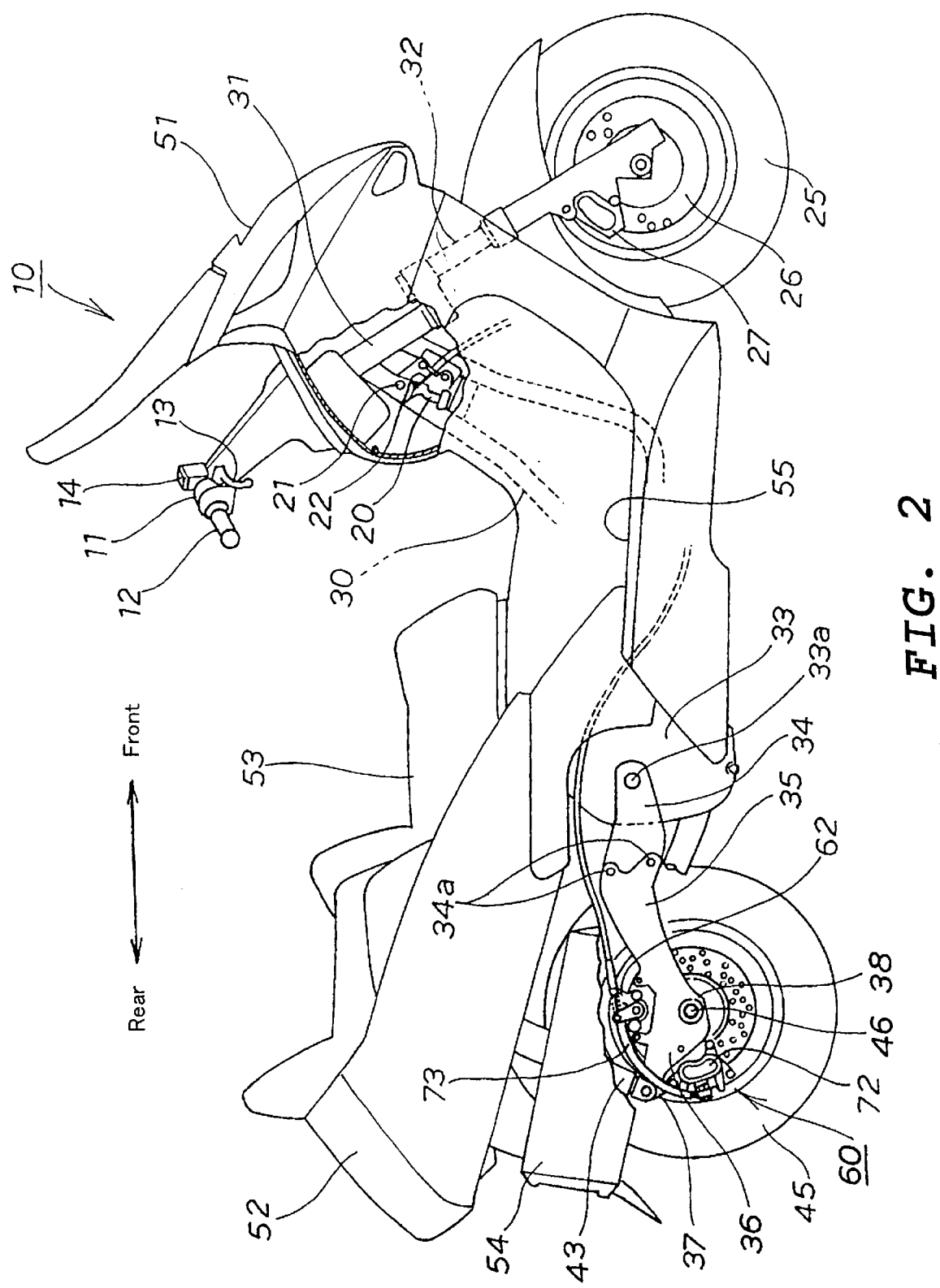
FIG. 2 is a side view of a motorcycle according to the present invention.

Referring now to FIG. 2, in the motorcycle 10, the handle 11 and the front wheel 25 are respectively mounted on upper and lower end portions of a front fork 32, a front brake disc 26 is mounted on the front wheel 25, and a front brake caliper 27 is mounted on a lower end portion of the front fork 32.

The motorcycle 10 is a scooter type motorcycle, wherein the front fork 32 is mounted on a head pipe 31 of a body frame 30, an engine 33 is mounted on the center of the body frame 30, a front swing arm 34 is mounted on the engine 33 by way of an output shaft 33a such that the front swing arm 34 is capable of swinging in the upward and downward direction, a swing arm 35 is mounted on the front swing arm 34 by means of bolts 34a, 34a, the rear wheel 45 is supported on a rear wheel shaft supporting portion 38 of the swing arm 35 by way of a rear wheel shaft 46, a swing arm extension portion 36 which is extended in the rearward direction from the rear wheel shaft supporting portion 38 is formed on the swing arm 35, a rear end (rear end connecting portion) 37 of the swing arm extension portion 36 is suspended from the rear portion of the body frame 30 by way of a shock absorbing damper 43, and a brake device 60 of the motorcycle is mounted on the swing arm extension portion 36. Reference numeral 51 indicates a front cover, numeral 52 indicates a rear cover, numeral 53 indicates a seat, numeral 54 indicates a muffler, and numeral 55 indicates a floor step.

Figure 3:
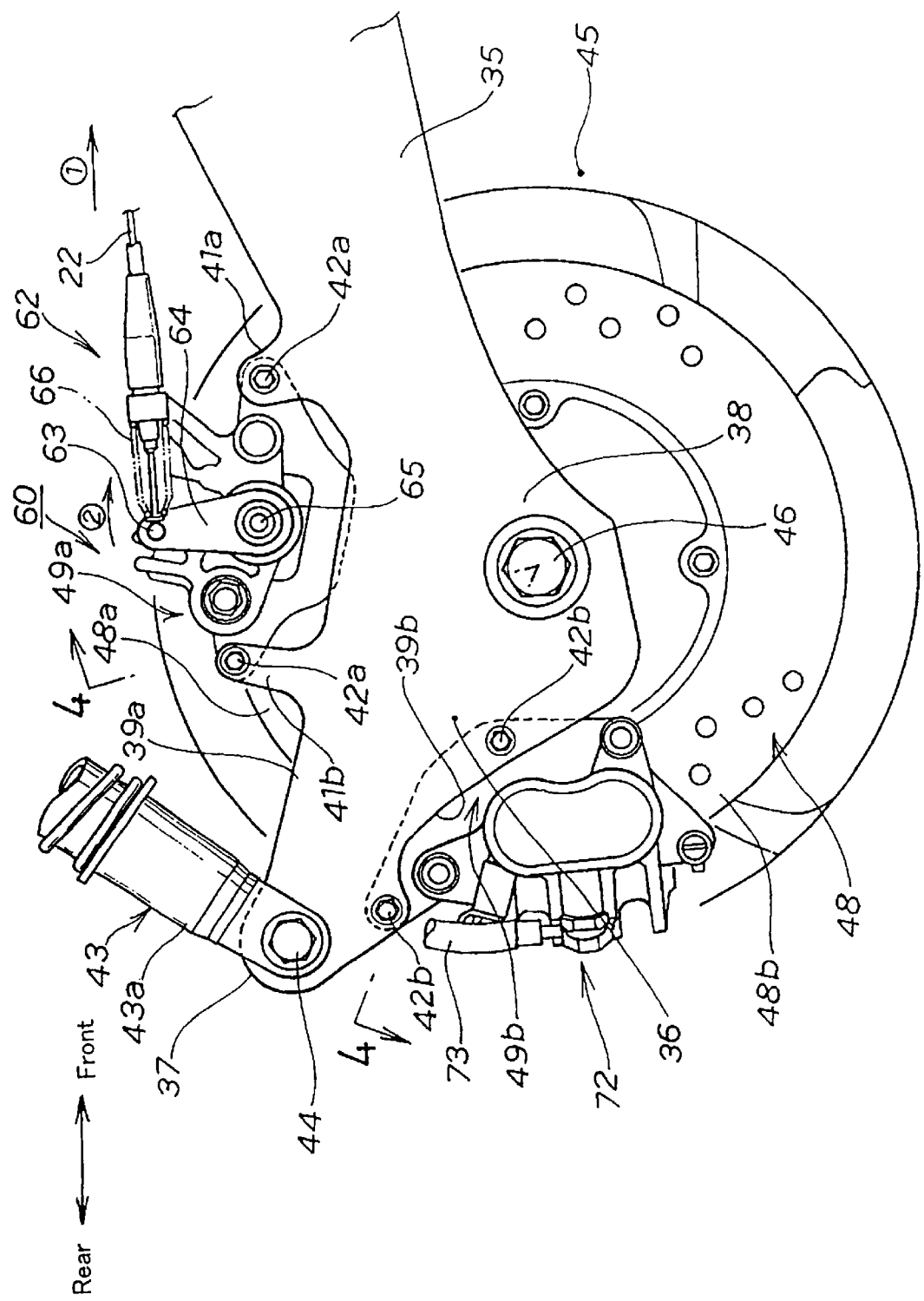
FIG. 3 is an enlarged view of a part of a brake device of the motorcycle according to the present invention.

As shown in FIG. 3, in the brake device 60 of the motorcycle, the rear wheel 45 is rotatably mounted on the rear wheel shaft supporting portion 38 by way of the rear wheel shaft 46. The swing arm extension portion 36 is extended in the rearward direction from the rear wheel shaft supporting portion 38 with the upward gradient in a tapered form. A rear end connecting portion 37 is provided to the extended swing arm extension portion 36. One end (lower end) 43a of a damper 43 is connected to the rear end connecting portion 37 by means of a bolt 44. A parking brake caliper 62 is arranged above the swing arm extension portion 36, and a rear brake caliper 72 is arranged below the swing arm extension portion 36.

By extending the swing arm extension portion 36 toward the rear end connecting portion 37 from the rear wheel shaft supporting portion 38 which supports the rear wheel shaft 46 with the upward gradient in a tapered form, a gentle upper gradient extended in the rearward direction is formed on an upper side 39a and a steep upper gradient extended in the rearward direction is formed on a lower side 39b.

Due to such construction, a space 49a which faces an outer periphery 48a of an upper portion of the rear brake disc 48 is formed along the upper side 39a of the swing arm extension portion 36 and a space 49b which faces an outer periphery 48b of a rear portion of the rear brake disc 48 is formed along the lower side 39b of the swing arm extension portion 36. Accordingly, front and rear mounting portions 41a, 41b can be protruded from the upper side 39a with a given distance between them and by mounting a parking brake caliper 62 to these mounting portions 41a, 41b by means of bolts 42a, the parking brake caliper 62 can be arranged such that the parking brake caliper 62 faces the outer periphery 48a of the upper portion of the rear brake disc 48.

By mounting a rear brake caliper 72 to the lower side 39b by means of bolts 42b, the rear brake caliper 72 can be arranged so that the rear brake caliper 72 faces the outer periphery 48b of the rear portion of the rear brake disc 48. In this manner, by extending the swing arm extension portion 36 in the rearward direction of the body with the upward gradient, the swing arm extension portion 36 can be arranged above the rear wheel shaft supporting portion 38. Accordingly, the rear brake caliper 72 can be arranged in the state that the rear brake caliper 72 is elevated up to the outer periphery 48b of the rear portion of the rear brake disc 48. Accordingly, the bank angle of the motorcycle 10 can be increased.

With respect to the rear brake caliper 72, when the rear brake lever 17 (shown in FIG. 1) is manipulated, the hydraulic pressure is transmitted through a pipe 73 (see also FIG. 2) so as to apply a brake force to the rear brake disc 48 using this hydraulic pressure.

With respect to the parking brake caliper 62, when the parking lever 20 (see FIG. 2) is pulled upwardly about a pin 21 as an axis, a cable 22 is pulled as indicated by an arrow 1 and a pulling force of the cable 22 is transmitted to a lever 64 by way of a pin 63. Accordingly, the lever 64 is swung about a rod 65 as an axis as indicated by an arrow 2 so as to lock the rear brake disc 48. When the parking lever 20 is released, the lever 64 returns to the release position due to a spring force of a return spring 66.

Figure 4:
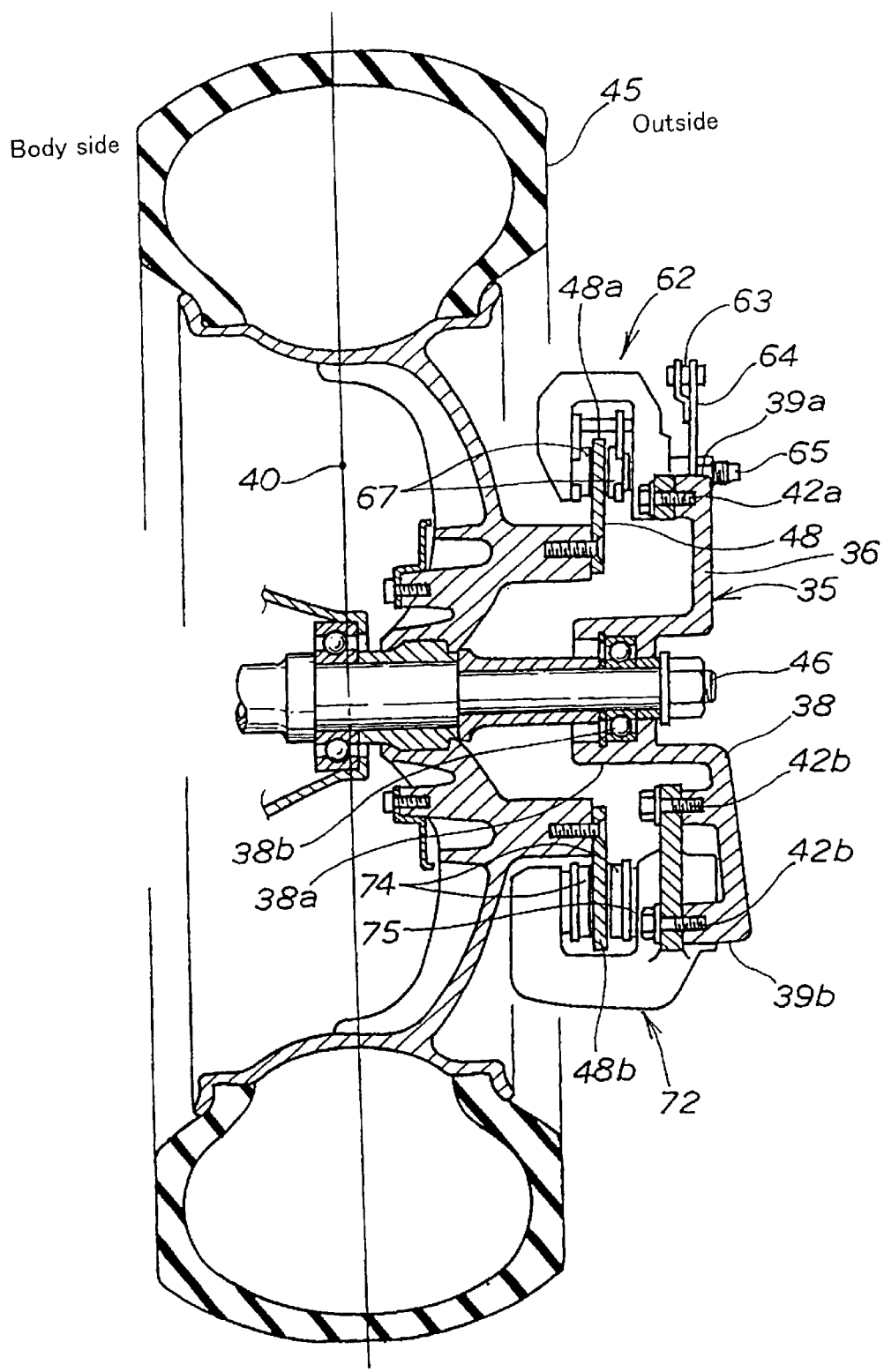
FIG. 4 is a cross-sectional view of FIG. 3 taken along a line 4—4.

As shown in FIG. 4, the rear wheel shaft supporting portion 38 of the swing arm 35 is provided with a boss 38a which is recessed toward a body center 40 side and the rear wheel 45 is rotatably supported on the rear wheel shaft supporting portion 38 by rotatably supporting the rear wheel shaft 46 on this boss portion 38a by way of the bearing 38b.

By mounting the parking brake caliper 62 on the upper side 39a of the swing arm extension portion 36 by means of the bolts 42a, brake pads 67 of the parking brake caliper 62 can be arranged at both sides of the outer periphery 48a of the upper end of the rear brake disc 48. Further, by mounting the rear brake caliper 72 on the lower side 39b of the swing arm extension portion 36 by means of the bolts 42b, brake pads 74 of the rear brake caliper 72 can be arranged at both sides of the outer periphery 48b of the lower end of the rear brake disc 48.

In this manner, by mounting the parking brake caliper 62 and the rear brake caliper 72 on the upper and lower sides 39a, 39b of the swing arm extension portion 36, it becomes unnecessary to shift the swing arm 35 from the center of the body 40 toward the outside in the body width direction more than necessary. Accordingly, this is advantageous in assuring the bank angle of the motorcycle 10.

With respect to the rear brake caliper 72, by manipulating the rear brake lever 17 (shown in FIG. 1), the hydraulic pressure is applied to two pistons 75 in the caliper 72 so as to push out the pistons 75 from the caliper 72 so that the brake pads 74 are pushed to both surfaces of the rear brake disc 48. Accordingly, it is possible to apply the braking force to the rear wheel 45.

With respect to the parking brake caliper 62, when the parking lever 20 shown in FIG. 1 is pulled upwardly about the pin 21 as an axis, the cable 22 is pulled and the lever 64 is swung as shown in FIG. 3. Accordingly, the rod 65 is fed toward the rear brake disc 48 side by a screw engagement so as to push brake pads 67 to both surfaces of the rear brake disc 48. Accordingly, the rear brake disc 48 is locked so that the rear wheel 45 can be held in the still state.

Figure 5:
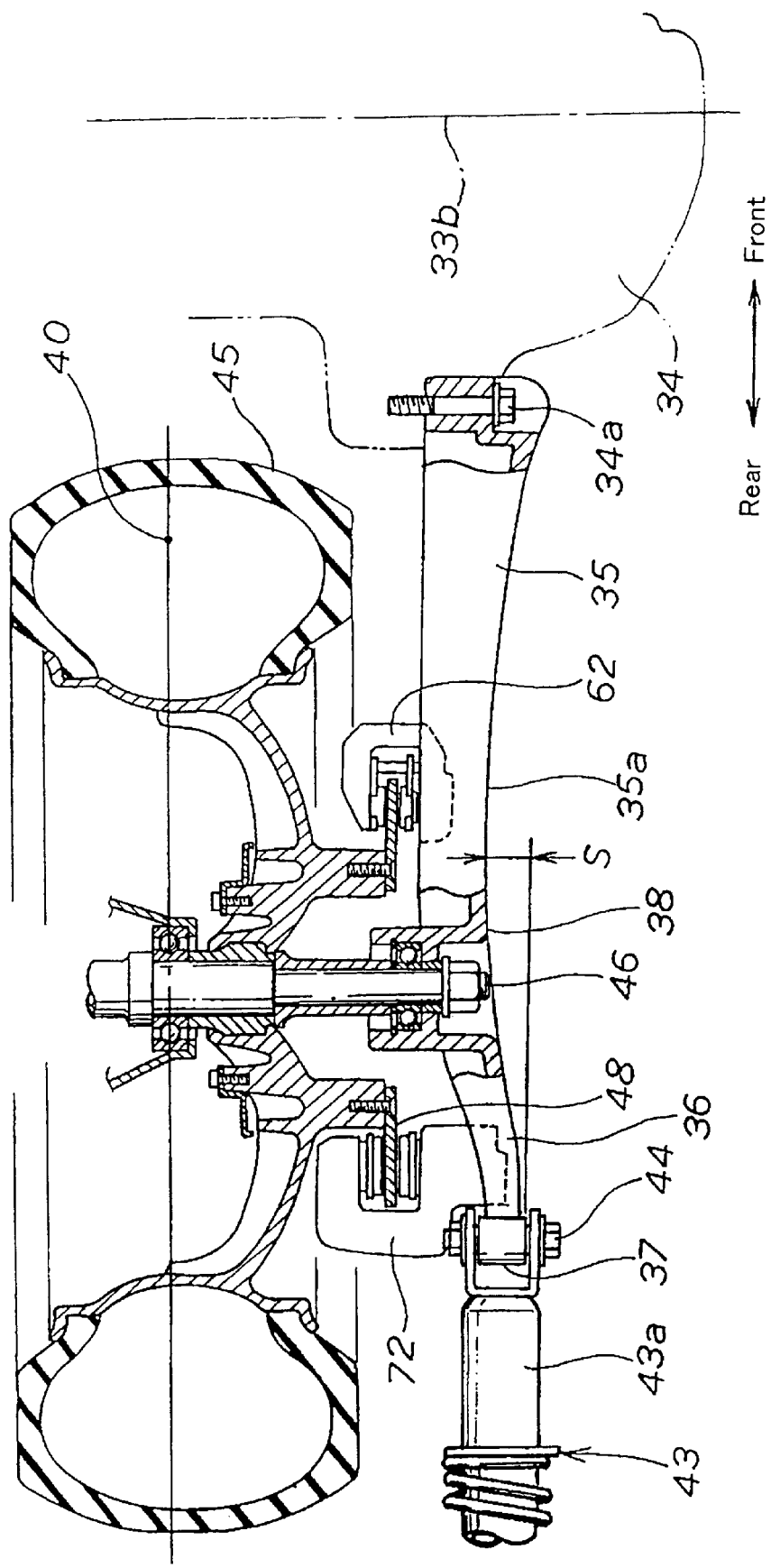
FIG. 5 is a view showing a layout of a motorcycle according to the present invention.

As shown in FIG. 5, by mounting the swing arm 35 on the front swing arm 34 by means of the bolts 34a, the front swing arm 34 and the swing arm 35 are mounted so that they can swing in the upward and downward about the center 33b of the output shaft 33a (see FIG. 2) of the engine 33 as the center. Further, the swing arm extension portion 36 of the swing arm 35 is extended in the rearward direction from the rear wheel shaft supporting portion 38, and the parking brake caliper 62 and the rear brake caliper 72 are mounted on the swing arm extension portion 36.

The parking brake caliper 62 is shown in the state that the parking brake caliper 62 is arranged at the swing arm 35 side for the convenience sake. In this manner, by mounting the respective brake calipers 62, 72 on the upper and lower sides 39a, 39b of the swing arm extension portion 36 (see FIG. 4), it is unnecessary to shift the swing arm 35 toward the outside in the body width direction from the center 40 of the body more than necessary. Accordingly, the center 35a of the swing arm 35 can be recessed toward the body side from the position of the rear end connecting portion 37 in a curved shape by a distance S. Accordingly, the degree of freedom of designing can be enhanced with respect to the shape and the arrangement of the muffler 54 (shown in FIG. 2), for example.

Further, in this embodiment, the example in which the parking brake caliper 62 is mounted on the upper side 39a of the swing arm 35 as the first brake caliper and the rear brake caliper 72 is mounted on the lower side 39b of the swing arm 35 as the second caliper has been explained. However, the parking brake caliper 62 may be mounted on the lower side 39b and the rear brake caliper 72 may be mounted on the upper side 39a.

Still further, although the example in which the parking brake caliper 62 is used as the first caliper and hence, the first caliper adopts a mechanical brake has been explained, by using the rear brake caliper as the first brake caliper as in the case of the second brake caliper, it is possible to adopt the hydraulic brake in both of the first and second brake calipers.

The present invention achieves several advantageous effects due to the above-mentioned constitution. The swing arm extension portion which is extended in the rearward direction from the rear wheel shaft supporting portion is provided to the swing arm. Due to such a constitution, it is possible to form the space which faces the outer periphery of the upper portion of the brake disc at the upper side of the swing arm extension portion and the space which faces the outer periphery of the rear portion of the brake disc at the lower side of the swing arm extension portion.

Accordingly, it is possible to mount the first and second brake calipers which are arranged above and below the swing arm extension portion on the upper and lower sides of the swing arm extension portion. In addition to the above, it is possible to make the first brake caliper face the outer periphery of the upper portion of the brake disc and to make the second brake caliper face the outer periphery of the rear portion of the brake disc. Accordingly, it is unnecessary to shift the swing arm toward the outside in the body width direction more than necessary to mount the first and second brake calipers.

As a result, the restrictions on the arrangement of the swing arm can be attenuated so that the degree of freedom in designing can be enhanced. In addition, it is possible to ensure the sufficient bank angle of the motorcycle.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A brake device of a motorcycle which supports a rear wheel with a swing arm mounted on a body, stretches a damper between the swing arm and the body, and includes first and second brake calipers to apply a brake force to a brake disc of the rear wheel, wherein a swing arm extension portion which is extended in the rearward direction from a rear wheel shaft supporting portion is formed on the swing arm, one end of the damper is connected to a rear end of the swing arm extension portion, and the first and second brake calipers are disposed above and below the swing arm extension portion.

2. A motorcycle comprising:

a body;

a swing arm having a first end pivotally attached to said body, a second opposite end which forms a swing arm extension portion, and a wheel shaft supporting portion therebetween;

a wheel rotatably supported at said wheel shaft supporting portion of said swing arm; and a brake device associated with said wheel, said brake device including a brake disc attached to said wheel;

a first brake caliper disposed above said swing arm extension portion for applying a brake force to said brake disc of said wheel; and a second brake caliper disposed below said swing arm extension portion for applying a brake force to said brake disc of said wheel.

3. The motorcycle as set forth in claim 2, further comprising a damper extending between said swing arm and said body.

4. The motorcycle as set forth in claim 3, wherein one end of said damper is connected to a distal end of said swing arm extension portion.

5. The motorcycle as set forth in claim 2, wherein said wheel is a rear wheel.

6. The motorcycle as set forth in claim 2, wherein said first brake caliper is a parking brake, and said second brake caliper is a running brake.

7. The motorcycle as set forth in claim 6, wherein said parking brake is actuated by pulling a cable attached to said first brake caliper.

8. The motorcycle as set forth in claim 7, wherein said running brake is actuated by hydraulic fluid pressure fed to said second brake caliper.

9. The motorcycle as set forth in claim 2, wherein said first brake caliper is a running brake, and said second brake caliper is a parking brake.

10. The motorcycle as set forth in claim 9, wherein said running brake is actuated by hydraulic fluid pressure fed to said first brake caliper.

11. The motorcycle as set forth in claim 10, wherein said parking brake is actuated by pulling a cable attached to said second brake caliper.

12. The motorcycle as set forth in claim 2, wherein said first brake caliper is disposed directly vertically above said wheel shaft supporting portion of said swing arm.

13. The motorcycle as set forth in claim 12, wherein said second brake caliper is disposed directly horizontally behind said wheel shaft supporting portion of said swing arm.

14. The motorcycle as set forth in claim 2, wherein said second brake caliper is disposed directly horizontally behind said wheel shaft supporting portion of said swing arm.

15. A motorcycle comprising:

a body;

a swing arm having a first end pivotally attached to said body, a second opposite end which forms a swing arm extension portion, and a wheel shaft supporting portion therebetween;

a rear wheel rotatably supported at said wheel shaft supporting portion of said swing arm; and a brake device associated with said rear wheel, said brake device including a brake disc attached to said rear wheel;

a first brake caliper disposed above said swing arm extension portion and directly vertically above said wheel shaft supporting portion of said swing arm for applying a brake force to said brake disc of said rear wheel; and a second brake caliper disposed below said swing arm extension portion and directly horizontally behind said wheel shaft supporting portion of said swing arm for applying a brake force to said brake disc of said rear wheel.

16. The motorcycle as set forth in claim 15, further comprising a damper extending between said swing arm and said body, wherein one end of said damper is connected to a distal end of said swing arm extension portion.

17. The motorcycle as set forth in claim 16, wherein said first brake caliper is a parking brake, and said second brake caliper is a running brake.

18. The motorcycle as set forth in claim 17, wherein said parking brake is actuated by pulling a cable attached to said first brake caliper.

19. The motorcycle as set forth in claim 18, wherein said running brake is actuated by hydraulic fluid pressure fed to said second brake caliper.

* * * * *